US012571754B2

(12) United States Patent　　(10) Patent No.:　US 12,571,754 B2
Kurth et al.　　　　　　　　　　(45) Date of Patent:　　Mar. 10, 2026

---

(54) SENSOR HAVING A SOLID-STATE LAYERED STRUCTURE, AND METHOD OF PRODUCING A SENSOR

(71) Applicant: Fraunhofer-Gesellschaft zur Förderung der angewandten Forschung e.V., Munich (DE)

(72) Inventors: Eberhard Kurth, Dresden (DE); Christian Kunath, Dresden (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 994 days.

(21) Appl. No.: 17/725,948

(22) Filed: Apr. 21, 2022

(65) Prior Publication Data

US 2022/0244206 A1　　Aug. 4, 2022

Related U.S. Application Data

(63) Continuation of application No. PCT/EP2020/079801, filed on Oct. 22, 2020.

(30) Foreign Application Priority Data

Oct. 23, 2019　(DE) .......................... 102019216327.0

(51) Int. Cl.
　　*G01N 27/22*　　　(2006.01)
　　*G01N 27/30*　　　(2006.01)
　　*G01N 27/414*　　(2006.01)
(52) U.S. Cl.
　　CPC ........... *G01N 27/22* (2013.01); *G01N 27/301* (2013.01); *G01N 27/414* (2013.01)

(58) Field of Classification Search
　　CPC ..... G01N 27/22; G01N 27/414; G01N 27/301
　　See application file for complete search history.

(56) References Cited

U.S. PATENT DOCUMENTS 5,804,049 A　　9/1998　Chan
2001/0032784 A1　10/2001　Chan
　　　　　　　　(Continued)

FOREIGN PATENT DOCUMENTS

CN　　103890575 A　　6/2014
CN　　104584252 A　　4/2015
　　　　　(Continued)

OTHER PUBLICATIONS

Resistivity of Aluminum Oxide; The Physics Factbook; Glenn Elert et al.; URL: https://web.archive.org/web/20061107150412/https://hypertextbook.com/facts/2006/EuniceHuang.shtml (Year: 2006).*

(Continued)

*Primary Examiner* — Christine S. Kim
*Assistant Examiner* — Tyler J Wiegand
(74) *Attorney, Agent, or Firm* — Bridgeway IP Law Group, PLLC; Jihun Kim

(57)　　　　　ABSTRACT

Sensor devices and systems having a solid-state layered structure and methods of producing the sensor devices and systems are described. In one embodiment, a sensor includes a first layer including a semiconductor material, a second layer including a gold material and an oxygen material, and an insulation layer arranged between the first and second layers.

22 Claims, 5 Drawing Sheets

(56) References Cited

U.S. PATENT DOCUMENTS

| | | | |
|---|---|---|---|
| 2010/0148222 A1 | 6/2010 | Krauss et al. | |
| 2010/0261287 A1* | 10/2010 | Holt | G01N 27/227 |
| | | | 422/69 |
| 2012/0139011 A1 | 6/2012 | Zeun | |
| 2014/0054651 A1 | 2/2014 | Bashir et al. | |
| 2014/0264467 A1 | 9/2014 | Cheng et al. | |
| 2014/0291160 A1 | 10/2014 | Schierbaum et al. | |
| 2015/0295195 A1 | 10/2015 | Pfeiffer et al. | |
| 2016/0047775 A1* | 2/2016 | Roop | G01N 27/4148 |
| | | | 204/406 |
| 2016/0274057 A1 | 9/2016 | Kurth et al. | |
| 2017/0160226 A1 | 6/2017 | Huang et al. | |
| 2017/0234861 A1 | 8/2017 | Chen et al. | |
| 2017/0350936 A1* | 12/2017 | McMeen | G01L 19/147 |
| 2018/0275092 A1 | 9/2018 | Fanselow et al. | |

FOREIGN PATENT DOCUMENTS

| | | |
|---|---|---|
| CN | 110031532 A | 7/2019 |
| DE | 19850592 C1 | 10/2000 |
| DE | 102008054752 A1 | 6/2010 |
| EP | 1889043 B1 | 2/2008 |
| GB | 1071068 A | 6/1967 |
| WO | 0027175 A1 | 5/2000 |
| WO | 2006/128804 A1 | 12/2006 |

OTHER PUBLICATIONS

Mathias Wipf et al.; Selective Sodium Sensing with Gold-Coated Silicon Nanowire Field-Effect Transistors in a Differential Setup; ACS Nano 2013 7 (7), 5978-5983; DOI: 10.1021/nn401678u (Year: 2013).*
M. Fujihira et al., "Chemically modified parylene gate field effect transistors, Preparation of pH insensitive parylene gate for chemical medication", J. Electroanal. Chem. 106, pp. 413-418, 1980.
H.-S. Wong et al., "A CMOS-integrated "ISFET-Operational Amplifier" Chemical Sensor Employing Differential Sensing", IEEE Transactions on Electron Devices 36, No. 3, pp. 479-487, Mar. 1989.
D. Wilhelm et.al., "pH Sensor based on Differential Measurements on One pH-FET Chip", Sensors and Actuators B, 4, pp. 145-149, 1991.
V. Rochers et.al., "An Oxynitride ISFET Modified for Working in a Differential Mode for pH Detection", Journal of The Electrochemical Society, 141, pp. 535-539, 1994.
T. Matsuo et al., "Characteristics of Reference Electrodes Using a Polymer Gate ISFET", Sensors and Actuators 5, pp. 293-305, 1984.
A Van Den Berg et al., "Sensitivity Control of ISFETs By Chemical Surface Modification", Sensors and Actuators 8, pp. 129-148, 1985.

P. Bergveld et al., "How Electrical And Chemical Requirements For REFETs May Coincide", Sensors and Actuators 18, pp. 309-327, 1989.
M. Chudy et.al., "Towards REFET", Sensors and Actuators B 57, pp. 47-50, 1999.
H. S. Philip Wong, "The Physics and Technology of the ION Sensitive Field Effect Transistor (ISFET)", Dissertation, Lehigh University, pp. 104-105, 1988.
M. Zaborowski et.al., "Development of REFET for Differential Measurements of pH in a Fluidic System", Przeglad Elektrotechniczny, Instytut Technologii Elektronowej 2014, R.90, No. 11/2014, pp. 142-146.
Brdička, "Grundlagen der physikalischen Chemie", 10th edition, VEB deutscher Verlag der Wissenschaften, Berlin, pp. 630-634, 1971.
Minju Kim et al., "Effect of pH on Anodic Formation of Nanoporous Gold Films in Chloride Solutions: Optimization of Anodization for Ultrahigh Porous Structures", Langmuir 30, pp. 4844-4851, 2014.
R.F. Tabor et al., "Effect of Gold Oxide in Measurements of Colloidal Force", Langmuir 27, pp. 6026-6030, 2011.
N.V. Venkataraman et al., "Chapter 6: Patterning Gradients", Methods of Cell Biology 119, pp. 91-121, 2014.
J.T. Miller et al., "The effect of gold particle size on Au—Au bond length and reactivity toward oxygen in supported catalysts", Journal of Catalysis 240, pp. 222-234, 2006.
Ozansoy Kasap, B. et al., "Biosensors Based on Nano-Gold/Zeolite-Modified Ion Selective Field-Effect Transistors for Creatinine Detection", Nanoscale Research Letters, vol. 12, 2017, Article No. 162.—DOI 10.1186/s11671-017-1943-x, 2017.
Shul'ga, A. A. et al., "Operation of an ISFET with non-insulated substrate directly exposed to the solution", Sensors and Actuators B, vol. 30, pp. 101-105.—DOI 10.1016/0925-4005(95)01760-S, 1996.
Mathias Wipf et al., "Selective Sodium Sensing with Gold-Coated Silicon Nanowire Field-Effect Transistors in a Differential Setup", ACS NANO, (Jul. 23, 2013), vol. 7, No. 7, doi:10.1021/nn401678u, ISSN 1936-0851, pp. 5978-5983, XP055395247, 2013.
Jenny Gun et al., "Oxygen plasma-treated gold nanoparticle-based field-effect devices as transducer structures for bio-chemical sensing", Microchimica Acta ; An International Journal on Micro and Traceanalysis, Springer-Verlag, VI, (Jul. 4, 2008), vol. 164, No. 3-4, ISSN 1436-5073, pp. 395-404, XP019720900, 2009.
Zeng Ruixue et al. "Modelling and characterization of novel referenceless semiconductor ion sensor for pH sensing", Sensors and Actuators B: Chemical 281, pp. 60-71, 2019.
Mathias Wipf et al., "Selective Sodium Sensing with Gold-Coated Silicon Nanowire Field-Effect Transistors in a Differential Setup", ACS Nano, vol. 7, No. 7, p. 5978-5983, Jun. 14, 2013.
Fang Zhang, "Office Action for CN Application No. 202080076149. 1", Jan. 2, 2024, CNIPA, China.

* cited by examiner

1000

Providing 1100 an initial layered structure having a first layer 110 and an insulation layer 120, the first layer 110 comprising a semiconductor material

1100

Producing 1200 a second layer 150, such that the second layer 150 comprises a gold material and an oxygen material, and such that the second layer 150 is arranged to be separated from the first layer 110 by the insulation layer 120

1200

5000

SENSOR HAVING A SOLID-STATE LAYERED STRUCTURE, AND METHOD OF PRODUCING A SENSOR

CROSS-REFERENCES TO RELATED APPLICATIONS

This application is a continuation of copending International Application No. PCT/EP2020/079801, filed Oct. 22, 2020, which is incorporated herein by reference in its entirety, and additionally claims priority from German Application No. DE 102019216327.0, filed Oct. 23, 2019, which is incorporated herein by reference in its entirety.

The present invention relates to the technical field of measuring ion concentrations, and more particularly to measuring ion concentrations while using solid-state sensors.

Embodiments of the present invention relate to a sensor having a solid-state layered structure. Further embodiments of the present invention relate to a method of producing a sensor.

BACKGROUND OF THE INVENTION

In conventional ion concentration measurement based on the electrochemical measurement method, one works with 2 electrodes, (A) and (B). One electrode (A) is the one that selectively responds to one ion type by changing its electric potential in proportion to the ion concentration in measurement solution that is to be sensed in a selective manner. The other electrode (B), where the electrode type is most commonly used, reacts only to a very small extent little to any changes in ion concentrations in the same measurement medium because it has a specific compartment where the ion concentration is kept very high and constant (e.g. 19.5% by mass of a potassium chloride/water solution), but where there is a connection to the measurement medium through a point of constriction, which is so small that the concentration in the electrode compartment is changed to an insignificant degree only. The electrode material of this less sensitive electrode (B) is in electrochemical equilibrium with a sparingly soluble salt of the electrode material, whereby this electrode may also perform a grounding function, especially when the sensitive electrode part (A) functions via an electrically highly resistive sensor membrane. There is another type of electrode (Bn), which is of little importance in practice, however, because its operating cost is too high. This electrode is the normal hydrogen electrode (NHE).

As an alternative to the commonly used electrodes A and B, solid-state sensors may theoretically also be used to measure an ion concentration, i.e. a concentration of a certain ion type, in a measurement medium, usually a liquid. In this case, too, one needs an ion-sensitive sensor S, which reacts selectively to the ion type to be measured, and a comparative sensor V, which reacts only very slightly, ideally only to a minimum extent, to a change in the ion concentration in the measurement medium. By combining a less ion-sensitive sensor V with a more ion-sensitive sensor S, which responds selectively to an ion concentration, and with an electrically conductive electrode C, it is possible to selectively sense a desired ion concentration. The two solid-state sensors S, V are based, for example, on the field effect that is present across an insulator, which changes the conductivity in a semiconductor located below the insulator. During measurement operation, they are therefore both insulated from the electrically conductive medium to be measured. To avoid electrical charging, an electrically conductive electrode C, which grounds the measurement solution, is implemented in the sensor system consisting of the sensors S and V and of the electrode C.

Applications of such an ion-sensitive sensor system which consists of solid matter almost throughout and exhibits the field-effect principle (ISFET, EIS and LAPS sensors) are in environmental monitoring, in biochemical/medical engineering and also in the food industry and other industrial process monitoring. One main area of application is pH measurement technology. A circuit useful for this purpose has already been presented in [2].

Ion-sensitive solid-state sensor parts such as ISFETs are for the most part manufactured by means of Si semiconductor technology. They have certain application-dependent advantages over the pH glass electrodes that have been produced for some time. On the one hand, there is the advantage that no splintering glass breakage may occur, and on the other hand, ion-sensitive solid-state sensor parts lack the internal buffer, which is not a solid body in glass electrodes, for example, and which is dissolved in the measurement medium when destroyed. Further advantages may be mentioned, such as freedom from turnover of materials and negligible pressure sensitivity. The ion-sensitive solid-state semiconductor sensors as have been produced and used up to now, mostly with an ISFET structure, have the goal of reacting to a slight change in ion concentration with the highest possible sensitivity, i.e. with the highest possible but stable constant potential change. The sensor characteristic is the sensor slope, usually indicated by mV/p[ion] at defined temperature and pressure. In order that the potential, that is dependent on the ion concentration, of the field-effect solid-state sensor may be determined, a second sensor element may also be used within this context.

Instead of using a solid-state sensor as a comparative sensor V, however, a conventional so-called reference electrode B is still used as a reference value for the measurement, which electrode B firstly supplies the same potential irrespective of the change in the concentrations of the ions present, secondly simultaneously serves as a voltage transmitter for the potential of the measurement electrolyte, and thirdly operates as grounding to the measurement electrolyte. However, this electrode potential is dependent on temperature and pressure and on the concentration of the (typically) anion in the electrode compartment, which forms a sparingly soluble salt with the metal elution. Examples are the silver/silver chloride electrode and the standard calomel electrode. A particularly complex electrode is the normal hydrogen electrode, in which even the pressure of one reaction partner is directly included in the comparison potential. If the conventional metal salt electrode is destroyed, the electrolyte of the electrode compartment enters the measurement solution, which may be very harmful for the area of application. In order for grounding of such an electrode to succeed, ions are supposed to be able to migrate back and forth across the boundary of the electrode compartment to the measurement electrolyte, in most cases a so-called diaphragm. The objective that the ion concentration in the electrode compartment should remain constant is contradictory to the objective that the grounding should have as low an impedance as possible. The more the ion outflow at the boundary (diaphragm) is constricted by the geometry (porosity), the greater the electrical resistance will be there, and the greater the voltage drop at this resistor will be. No diaphragm material is ideal, so there are different movements of the ion types, so that the voltage drop at the diaphragm (diffusion voltage) changes, to a larger or smaller degree depending on pressure, temperature and on the composition of the measurement solution, in such a way that this results in an apparently random measurement error of the ion concentration.

In order to avoid these disadvantages of the reference electrode, it is desirable to provide the reference value for the sensor S by means of a solid-state sensor as a comparative sensor V. However, this involves a solid-state sensor having as low an ion sensitivity as possible. Since 1980, 5 years after the discovery of the field-effect ion sensor, attempts have been made to reduce the concentration of the ion-active surface centers of a sensor, or of a measurement surface of a sensor [1]. For this purpose, circuits have been developed where both sensors, the actual ion-sensitive one and the less ion-sensitive one, are read out in-situ via a difference formation and where the grounding contact is made with a noble metal and simultaneously takes over the control (grading) of the potential of the electrolyte [2,3,4]. With this principle, the potential quantity of the grounding electrode may be erroneous because the measurement electrolyte is the same for both sensors, and so is the grounding electrode. In the beginning, the aim was to achieve insensitivity for the comparison sensor as far as possible; later, a minimum ion sensitivity was allowed if this made the sensor more stable, and if the sensitivity and interference immunity of the circuit were high enough to provide sufficient measurement-value accuracy (noise/signal ratio) and measurement-value constancy via a sufficient slope mV/p[ion].

Different methods and materials have been used to reduce the concentration of ion-active surface centers. Before ion-sensitive field-effect transistors (FETs) were built with great technological effort, the studies were carried out on "electrolyte-insulator-semiconductor" (EIS) sensors. These are structures or components that were measured while using CV measurement ("capacitance/voltage" measurement). At a constant capacitance, one was able to determine the same potential shift as at the FETs. However, the basic condition of the CV measurement method is a high and approximately constant conductivity of the measurement solution, and that the sensor surface is protected from light or that the light permanently has exactly the same spectrum and intensity. Practically, the measurement accuracy is smaller than is possible with FET operation.

To reduce the ion sensitivity for the comparison sensor V, several approaches have been taken:

(i) Ion-active surface groups were combined with ion-inactive molecules. For example, Van den Berg [6] passivated the pH surface-active =Si—OH groups by silylating them with small molecules. As the degree of silylation increases, the sensor surface becomes more hydrophobic. The disadvantage of silylation is that it is chemically unstable against chemicals especially at higher temperatures, i.e., the generated bridge-type bond is broken and the ion sensitivity increases again. If the hydrophobicity is too high, wetting the sensor with an aqueous measurement solution becomes more difficult, and a gas film may even form between the measurement electrolyte and the sensor surface, which not only simulates a false pH value, but may also result in that the sensor's working range is left. The gas film does not have to come through the air, it may also come through outgassing of the measurement solution when the temperature is increased.

(ii) The chemical stability of a more hydrophobic surface may be increased by layer deposition of an organic polymer. M. Fujihira [1] tried to simply cover $H_+$-sensitive surface groups of $Si_3N_4$ by organic polymers, such as PVC and parylene. The deposition yielded unreproducible pH slopes of 10 to 50 mV/pH, and the layers did not adhere adequately. T. Matsuo & H. Nakajima [5] also achieved only a minimum of 10 mV/pH by parylene coverage. Depending on the process parameter details of the deposition, the ion sensitivity, stability and field intensity arriving in the semiconductor changed. Furthermore, the problem of wetting and gas film also occurs. Ions are blocked with these polymer layers [7].

(iii) M. Chudy [8] listed further arguments: An ion-blocking insulating polymer layer shows a) a dependence on the ionic strength (see also [11]), and b) a drift due to ions diffusing in. A layer that does not block ions ("blank membranes", membranes without ionophores) has a) a slight conductivity and b) is only permeable for cations. To suppress this permselectivity of cations, he incorporated, for example, a large lipophilic Na complex of calixpherand. This gave rise to very low sensitivity in the pH range pH2-10 for Na, K, Ca and for Cl. Further work is intended to replace the "plasticized PVC" with a more IC-compatible polymer such as polysiloxane. However, questions remained about temperature stability and toxicity.

(iv) As discussed in [8] with the search for more IC- ("integrated circuit") compatible materials, manufacturability in an IC-Si semiconductor fab is an important goal. The integration of an ion-sensitive sensor with a less ion-sensitive sensor together with the grounding electrode on one chip enables high and low-cost quantities. From the early years after the discovery of the field-effect ion sensor, it was learned that the silicon oxide has a small ion sensitivity by nature but is not sufficiently selective. Additives were alloyed into the sensing membrane of the conventional glass electrode to increase sensitivity. In the end, it was only possible to increase the selectivity by using a multicomponent system. In [2], an IC production technology was tested where the ion-blocking LP silicon nitride is thermally oxidized to form silicon oxynitride, $SiO_XN_Y$, on $LP-Si_3N_4/SiO_2/Si$. In parallel, the gate oxide $SiO_2$ was also characterized in ion sensitivity. Here, ion sensitivities of 17-20 mV/pH from pH4 to pH9 were found for both $SiO_2$ and $SiO_XN_Y$, but also a photosensitivity of more than 250 mV. The sensor also had a drift of about 26 mV/h, and in the circuit (on chip) with the ISFET, the photosensitivity decreased to 40 mV, and the drift to 1 mV/h. To reduce the residual sensitivity even further, experiments of boron implantation into the silicon nitride were performed and measured by using the CV method. After that, however, the ion sensitivity, which is undesirable here, increased to $Na^+$ and $K^+$ Noble metal layers of either Au/Cr or Pt/Ti were configured as grounding electrodes [9]. Also [3] attempted something similar, producing PE silicon oxynitride. 32 mV/pH was obtained. Thereafter, the sensitivity increased with each use in acids or alkalis. In recent years, modern $O_2$ plasma processes have become available that are capable of oxidizing $LP-Si_3N_4$ 8 nm deep at less than 400° C. [10] and of achieving minimum slopes of about 16 mV/pH. However, the sensor signals exhibit hysteresis and drifts.

Others such as [4] tried a mixture of technologies such as PE silicon oxynitride deposition and silylation, but the stabilities are still too low.

The organic layers have too poor a field effect due to their low dielectric constants of 2 to 3, have insufficient long-term stable properties for constantly low ion sensitivity due to their amphoteric structure with too low a molecular density, and they become sensitive to the ionic strength of the measurement solutions due to the indiffusion of water molecules and cations. The production of non-blocking organic polymers having a number of organic specific additives does not improve the quality decisively; incorporated substances are washed out at higher temperatures and diffuse into the measurement solution where they are not wanted. Acid and alkali stability is limited to the pH range of 4 to 10 if the temperature remains below 50° C.

The inorganic layer $SiO_2$ also shows a very small ion sensitivity and a much larger dielectric constant of 4 and is semiconductor-compatible. But the very $SiO_2$ layers produced in IC technology are of amorphous structure and have low densities of 2.1 g/cm3, crystalline $SiO_2$ may reach 2.65 g/cm3. Thus, ion sensitivity increases as time and temperature in the measurement solution increase, and especially in the presence of alkaline media, since cations diffuse in and break the structure. The production of amorphous $SiO_XN_Y$ from amorphous $Si_3N_4$ results in a higher density, but due to the amorphous structure and the ion sensitivity of the nitrogen (because of the lone electron pair) to cations, similar drift and hysteresis processes are observed at a pH value above 9.

Given the drawbacks of previous solutions, there is a need for a sensor that offers an improved compromise between a surface that is as chemically stable as possible, thermal stability that is as good as possible, ion sensitivity that is as low as possible, and ease of manufacturability.

SUMMARY

The core idea of the present invention is that a layer having a gold material and an oxygen material has very low but existing ion sensitivity. Thus, such a layer having a gold material and an oxygen material is very suitable as a sensor layer, especially for an ion-sensitive sensor having low ion sensitivity.

According to an embodiment, a sensor having a solid-state layered structure may have:

a first layer including a semiconductor material;
a second layer including a gold material and an oxygen material,
an insulation layer arranged between the first layer and the second layer,
wherein the second layer is arranged to be separated from the first layer by the insulation layer,
wherein the second layer includes a measurement surface that faces away from the insulation layer, and
wherein the second layer has a thickness of between 5 nm and 10 μm, or
wherein the second layer has an oxygen proportion of between 0.1 at % and 67 at %.

According to another embodiment, a sensor system may have:

the sensor having a solid-state layered structure, including the following elements:
a first layer including a semiconductor material;
a second layer including a gold material and an oxygen material,
an insulation layer arranged between the first layer and the second layer,
wherein the second layer is arranged to be separated from the first layer by the insulation layer,
wherein the second layer includes a measurement surface that faces away from the insulation layer, and wherein the second layer has a thickness of between 5 nm and 10 μm, or
wherein the second layer has an oxygen proportion of between 0.1 at % and 67 at %;
an ion-sensitive sensor having an ion-sensitive sensor region;
a measurement volume adjacent to the measurement surface of the sensor and the ion-sensitive sensor region of the ion-sensitive sensor;
a grounding contact, the grounding contact being arranged adjacent to or within the measurement volume.

According to another embodiment, a method of producing a sensor may have the steps of:

providing an initial layered structure having a first layer and an insulation layer, the first layer including a semiconductor material;
producing a second layer,
such that the second layer includes a gold material and an oxygen material,
such that the second layer has an oxygen proportion of between 0.1 at % and 67 at %, or
such that the second layer has a thickness of between 5 nm and 10 μm, and
such that the second layer includes a measurement surface that faces away from the insulation layer, and
such that the second layer is arranged to be separated from the first layer by the insulation layer.

One embodiment of the present invention provides a sensor having a solid-state layered structure and comprising: a first layer, such as a substrate, comprising a semiconductor material; a second layer, such as a sensor layer, comprising a gold material and an oxygen material; and an insulation layer arranged between the first and second layers.

The sensor is based on the principle that by arranging the insulation layer between the first layer and the second layer, an electric field may be generated between the first layer and the second layer, or an electric potential may be present or built up or created between the first layer and the second layer. Such a field effect may, for example, be caused by ions on a surface of the second layer. For example, if the sensor is located in a liquid, such as a measurement medium, ions dissolved in this liquid and located on a surface of the second layer may cause a field effect in the sensor. Such a field effect is suitable to be read out or determined and may be used to determine an ion concentration in a liquid to be measured.

In that the second layer comprises a gold material and an oxygen material, particularly low sensitivity of the second layer to an ion concentration in a liquid to be measured may be achieved. For example, by having an oxygen material in addition to the gold material, the second layer has a greatly reduced ion sensitivity compared to a layer having only a gold material. For example, because the second layer has a gold material and an oxygen material, gold loses its high sensitivity to CI ions. Moreover, for example, sulfur may form adducts with gold atoms especially when previously present oxygen has been removed from the gold surface. Due to its low ion sensitivity, the sensor is, for example, particularly well suited for use as a comparative sensor V in a sensor system mentioned at the beginning. If the ion sensitivity of a sensor is particularly low, for example lower than the ion sensitivity of an ion-sensitive sensor, a change in an ion concentration of an ion when a measurement medium is changed may be determined from a sensor signal difference between a sensor and an ion-sensitive sensor. For such a measurement, it is particularly advantageous, for example, if the sensor has a particularly low sensitivity to the ion to be measured. By applying a noble metal/oxygen system, in particular a gold/oxygen system, for the second layer, i.e. a sensor layer, crystalline or semi-crystalline structures are made possible which may be only slightly ionically sensitive and are thermally stable, for example up to 50° C. or up to above the boiling point of aqueous solutions.

In order to use the sensor for determining an ion concentration in a liquid, it is particularly advantageous for a sensor surface of the sensor to have good wettability. By the second layer comprising both a gold material and an oxygen material, for example a mixture comprising both gold and oxygen, the hydrophilicity of the second layer increases, which favors wettability. In particular, an ion sensitivity of the second layer is so low, despite the presence of hydrophilicity, that a measurement accuracy is sufficiently high in a circuit sensor system.

The presence of the gold material and the oxygen material in the second layer, for example a compact layer, is also much less reactive than finely distributed particles having the same concentration of the oxygen material, for example oxygen, in a gold material, for example gold. The sensor also offers the advantage that a proportion of the gold material and a proportion of the oxygen material of the second layer can be adjusted. For example, a high proportion of the oxygen material in the second layer has a particularly beneficial effect on the insensitivity (e.g., a low sensitivity) of the second layer to ions. For example, a high proportion of the gold material in the second layer has a positive effect on long-term stability of the second layer. Thus, by a suitable choice of the proportions of the oxygen material and of the gold material in the second layer, the property (for example, the ion sensitivity and/or the stability) of the second layer, for example, of a sensor layer, may be adapted to the respective application.

Furthermore, the second layer comprising a gold material and an oxygen material can be produced comparatively easily, for example by plasma chemistry, by deposition or plasma deposition, by buffering or annealing processes, or by chemical deposition.

Because the second layer comprises a gold material and an oxygen material, the second layer has a high dielectric constant, i.e. a high polarizability. This increases a field effect in the sensor, whereby a current-voltage slope may be sufficiently steep and, thus, measurement errors may be reduced.

In summary, it can thus be stated that the sensor described which has a solid-state layered structure can be manufactured with comparatively little technological effort, has good metrological properties and makes it possible to find a good compromise between low ion sensitivity and stability, e.g. chemical and/or thermal resistance, of the sensor surface, depending on the applications.

In another embodiment, the second layer has an oxygen proportion of between 0.1% and 67%, that is, between 0.1 at % (atomic percent) and 67 at %. An oxygen proportion may also be referred to as an average oxygen concentration. For example, a shared total proportion of the gold material and of the oxygen material in the second layer may be greater than 99%. For example, the second layer may consist of the gold material and the oxygen material, apart from possible impurities due to other atoms. An oxygen proportion of more than 0.1% in the second layer ensures that the second layer has low ion sensitivity. An oxygen proportion of less than 67% ensures that the second layer is sufficiently stable both chemically and thermally. In addition, the oxygen proportion of the second layer may influence crystallinity of the second layer, for example, a size of crystals or crystal domains within which a material of the second layer has a crystalline form. For example, a low oxygen proportion may result in high crystallinity, i.e., large crystal domains, and a high oxygen proportion may result in low crystallinity. The oxygen proportion of the second layer may change during operation of the sensor, for example, during a contact of the sensor layer, for example of the second layer, with liquid, typically aqueous, media to be measured. For example, a second layer that had an oxygen proportion of 67% prior to a measurement may reach an oxygen proportion of less than 67% due to the introduction of hydrogen or water molecules, respectively, from these media during or after the measurement. Advantageously, the oxygen proportion of the second layer before and during a measurement is in a range between 0.1% and 67%.

In another embodiment, the second layer further comprises a noble-metal material having noble-metal atoms other than gold. Noble-metal atoms in the layer may include, for example, atoms of platinum, palladium, iridium, osmium, rhodium, and/or ruthenium. The oxygen proportion in the second layer is, for example, between 0.1% and 67% as described above. A shared total proportion of the gold atoms and the noble-metal atoms other than gold and of the oxygen atoms in the second layer may be, for example, at least 99%. In other words, the second layer, apart from impurities, may consist of gold atoms, oxygen atoms and noble-metal atoms other than gold. Since the second layer has noble-metal atoms other than gold, the chemical resistance of the second layer in specific media may be increased. For example, a particular type of noble-metal atom may increase a chemical resistance to a particular medium, for example, a particular measurement medium, for example, having a particular ion type.

According to another embodiment, the number of noble-metal atoms other than gold in the second layer is at most 25% of the number of gold atoms in the second layer. This may ensure low ion sensitivity in the second layer while increasing the chemical resistance of the second layer to specific media.

According to another embodiment, the second layer has a thickness of between 5 nm and 10 μm. A thickness of the second layer of more than 5 nm ensures that both the stability of the sensor and a defined ion sensitivity are guaranteed even if ions from a measurement medium, for example a liquid to be measured, penetrate the second layer. By a thickness of the second layer of less than 10 μm, a strength of a field effect between the first layer and the second layer is favored, so that improved measurement accuracy is achieved. For example, the thickness of the second layer may depend on the oxygen proportion of the second layer or may depend on a size of crystal domains of the second layer. For example, a large size of crystal domains may result in deep penetration of a liquid and/or of ions of a liquid into the second layer, which is why it may be advantageous to choose a larger thickness of the second layer.

According to another embodiment, an oxygen concentration of the second layer exhibits a gradient in a direction perpendicular to the second layer. In this regard, the direction perpendicular to the second layer may also be referred to, for example, as a direction perpendicular to a main surface of the second layer that faces the first layer, such as along a surface normal. For example, the oxygen concentration in the second layer may be higher at a surface that faces the insulation layer than at a layer center (with respect to a direction perpendicular to the second layer) of the second layer. For example, the oxygen concentration of the second layer may also increase from the layer center to a surface of the second layer that faces away from the insulation layer. Due to an increased oxygen concentration at a surface that faces the insulation layer, for example, an adhesion of the second layer to the insulation layer may be advantageously increased.

According to a further embodiment, the sensor further comprises a plurality of measurement contacts having electrically conductive connections to the first layer, wherein the measurement contacts are arranged adjacent to a main surface of the first layer that faces the second layer. For example, the measurement contacts may be configured to measure or determine a field effect between the first layer and the second layer. By the sensor additionally having the plurality of measurement contacts, a field effect between the first layer and the second layer can be measured or determined with particular accuracy.

According to a further embodiment, the insulation layer has an electrical resistance greater than 10 (GO) GOhm, advantageously greater than 100 (GO) GOhm, in a direction perpendicular to the insulation layer. A direction perpendicular to the insulation layer may also be a direction perpendicular to the first layer or perpendicular to the second layer. A particularly large electrical resistance of the insulation layer may increase a field effect between the first layer and the second layer, allowing the sensor to obtain more accurate measurement results.

According to another embodiment, the solid-state layered structure further comprises an electrically and/or ionically conductive intermediate layer arranged between the insulation layer and the second layer. An intermediate layer between the insulation layer and the second layer may ensure particularly good adhesion of the second layer to the insulation layer. The fact that the intermediate layer is configured to be electrically and/or ionically conductive may ensure a stronger field effect between the first layer and the second layer or the intermediate layer.

According to a further embodiment, the intermediate layer has a thickness of between 5 nm and 10 μm. A thickness of the intermediate layer of more than 5 nm can ensure good adhesion of the second layer to the intermediate layer. By a thickness of the intermediate layer of less than 10 μm it can be ensured that the intermediate layer does not affect, or hardly affects, a field effect between the first layer and the second layer.

According to a further embodiment, the intermediate layer has an electrical resistance lower than 100 MΩ in a direction perpendicular to the intermediate layer, for example in a direction perpendicular to the second layer. A small resistance of the intermediate layer increases the field effect between the first layer and the intermediate layer or the second layer, whereby more accurate measurement results may be generated.

According to another embodiment, the insulation layer is arranged adjacent to a main surface of the first layer. Further, the second layer is arranged opposite the main surface of the first layer, adjacent to the insulation layer. Such an arrangement of the solid-state layered structure makes the sensor particularly suitable for field-effect measurements. Furthermore, depending on the oxygen proportion of the second layer, the second layer may be electrically or ionically conductive. Due to the position of the second layer on the insulation layer, which in turn is located on a semiconductor material, electrochemical reactions that change the oxygen concentration beyond advantageous limits, for example lower it below an oxygen proportion in the second layer of 0.1% or increase it above an oxygen proportion in the second layer of 67%, are inhibited.

According to another embodiment, the insulation layer is arranged adjacent to a main surface of the first layer. Further, the intermediate layer is arranged opposite the main surface of the first layer, adjacent to the insulation layer. Further, the second layer is arranged opposite the insulation layer, adjacent to the intermediate layer. An arrangement of the second layer adjacent to the intermediate layer ensures good adhesion of the second layer to the intermediate layer. Furthermore, this arrangement of the solid-state layered structure has the advantages of the arrangement mentioned in the previous paragraph. Also, this arrangement is particularly well suited for field-effect measurements, or depending on the oxygen proportion of the second layer, the second layer may be electrically or ionically conductive.

According to a further embodiment, the sensor further comprises a sealing structure, which is arranged to spatially separate, from the first layer, a measurement surface of the second layer that faces away from the first layer, wherein the sealing structure is configured to prevent ionically and/or electrically conductive contact between the measurement surface and the first layer by a liquid, and wherein the sealing structure is impermeable and resistant to acidic and/or alkaline liquids. If the sensor has said sealing structure, it is particularly well suited for measuring ion concentrations in liquids, especially in acidic or alkaline liquids.

According to a further embodiment, the sensor further comprises an electrically conductive contact having an electrically conductive connection to the first layer. If the sensor has the electrically conductive contact to the first layer, the sensor may be particularly well used for taking capacitive measurements between the first layer and the second layer or also for taking field-effect measurements with the sensor.

According to another embodiment, the sensor has low ion sensitivity, for example, an ion sensitivity less than 46 mV/p(ion) at 25° C., or a sensor slope less than the Nernst slope (e.g. Nernst inclination) by more than 8% at any measurement temperature. Low ion-sensitivity is particularly advantageous for using the sensor as a comparative sensor for an ion-sensitive sensor having selective ion-sensitivity to determine an ion concentration.

An embodiment of the present invention provides a sensor system comprising the following elements: a sensor according to any of the preceding embodiments, wherein the second layer of the sensor has a measurement surface that faces away from the first layer of the sensor; an ion-sensitive sensor having an ion-sensitive sensor region; a measurement volume adjacent to the measurement surface of the sensor and to the ion-sensitive sensor region of the ion-sensitive sensor; a grounding contact, wherein the grounding contact is arranged adjacent to or within the measurement volume.

According to a further embodiment, the ion-sensitive sensor of the sensor system comprises a solid-state structure, and/or the grounding contact of the sensor system comprises a metal.

According to a further embodiment, the second layer of the sensor of the sensor system has a lower sensitivity to an ion to be detected than does a material of the ion-sensitive sensor region of the ion-sensitive sensor of the sensor system.

Another embodiment of the present invention provides a method of producing a sensor, comprising the steps of: providing an initial layered structure having a first layer and an insulation layer, wherein the first layer comprises a semiconductor material; producing a second layer such that the second layer comprises a gold material and an oxygen material, and such that the second layer is arranged to be separated from the first layer by the insulation layer.

According to another embodiment, the method further includes: producing an intermediate layer on the initial layered structure, wherein the intermediate layer comprises an electrically and/or ionically conductive material; such that the intermediate layer is arranged to be separated from the first layer by the insulation layer; and wherein producing the intermediate layer is performed prior to producing the second layer.

According to one embodiment, producing the second layer includes adjusting an ion sensitivity of the sensor.

The corresponding method of is based on the same considerations as does the device explained above. Furthermore, it should be noted that the method may be supplemented by any of the features, functionalities and details described herein with respect to the inventive device or sensor. The method of may be supplemented by said features, functionalities and details both individually and in combination.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
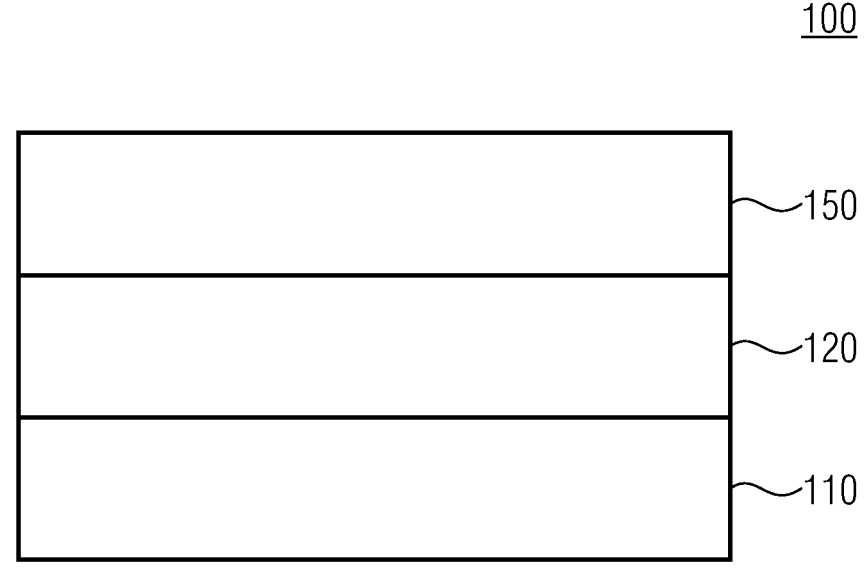
FIG. 1 a sectional side view of a sensor according to an embodiment.

In the following, embodiments will be described in more detail with reference to the figures, where elements having the same or similar functions are referred to by the same reference numeral.

Elements marked as optional are either optional elements or elements that are not part of the invention, but are shown in the drawing for a better understanding of the invention.

Method steps which are shown in a block diagram and are explained with reference thereto may also be configured in a sequence different from that shown or described. In addition, method steps relating to a particular feature of a device are interchangeable with said very same feature of the device, which also applies the other way around.

FIG. 1 shows a sectional side view of a sensor 100 having a solid-state layered structure according to an embodiment. By a layered structure is meant a structure comprising a plurality of layers, wherein the plurality of layers are arranged along a direction. A layer of the layered structure has two opposing main surfaces connected by minor surfaces. A main surface of one layer of two adjacent layers of the layered structure is arranged opposite a main surface of the other layer of the two adjacent layers. A surface normal of a layer is a direction perpendicular to a main surface of the layer. For example, a direction perpendicular to a layer is a direction parallel to a surface normal of the layer. For example, the direction along which the plurality of layers are arranged is parallel to a surface normal of a layer. For example, a direction perpendicular to the surface normal of a layer of the layered structure may be referred to as a lateral direction or a direction parallel to the layered structure or as a direction parallel to one of the plurality of layers of the layered structure.

The sensor 100 having a solid-state layered structure includes a first layer 110 comprising a semiconductor material. Further, the sensor 100 has a second layer 150 comprising a gold material and an oxygen material. Further, the sensor 100 has an insulation layer 120 arranged between the first layer 110 and the second layer 150, for example a layer having electrically insulating properties, i.e., having a high electrical resistance.

For example, the sensor 100 is a sensor for determining an ion concentration in a liquid. For example, the sensor 100 may be part of, or provided as part of, a sensor system comprising a plurality of sensors, the sensor system being capable, for example, of determining an ion concentration in a liquid. Such a sensor system may, for example, comprise two sensors, one sensor being sensitive to an ion type whose concentration is to be determined, and the other sensor, for example the sensor 100, having a low sensitivity to the ion type whose concentration is to be determined. Thus, the sensor 100 may provide, for example, a reference value for an ion concentration measurement. For example, the sensor 100 may be configured to have a low but finite sensitivity to the ion type whose concentration is to be measured. For example, the sensor 100 may serve as the comparative sensor V mentioned at the outset.

For example, the sensor 100 may be configured to determine a measurement value for determining an ion concentration of a liquid adjacent to the second layer 150. The measurement value may be, for example, a reference value for determining an ion concentration. To determine a measurement value, the sensor 100 may be configured, for example, to determine a capacitance between the first layer 110 and the second layer 150 or to determine a potential or electric field between the first layer 110 and the second layer 150. For example, the capacitance or potential or electric field may depend on a concentration of ions in a liquid to be measured that is adjacent to the second layer 150. Advantageously, this dependence is very small for the sensor 100. For example, a dependence of the capacitance or of the potential or of the electric field between the first layer 110 and the second layer 150 on the concentration of ions in a liquid adjacent to the second layer may depend, e.g., on a sensitivity of the second layer to the ions present in the liquid.

An ion sensitivity of the second layer 150 is particularly low because it comprises a gold material and an oxygen material. For example, a gold material may be gold or a compound of gold and one or more other elements. An oxygen material may be, for example, oxygen or a compound of oxygen and one or more other elements. For example, the second layer 150 may comprise a mixture of gold and oxygen. Alternatively or additionally, however, the second layer 150 may also comprise one or more different compounds between gold and oxygen, such as a gold oxide.

The first layer 110 comprises a semiconductor material. A semiconductor material may be, for example, silicon or another semiconductor material. The semiconductor material may also be doped, for example, e.g. so as to adapt a charge carrier density or a conductivity of the semiconductor material, for example with boron, indium, aluminum, gallium, phosphorus, arsenic, antimony.

The solid-state sensor structure, i.e. the sensor 100, may be, for example, the less ion-sensitive sensor part with regard to a more ion-sensitive sensor part and with regard to a grounding part in liquid media, and the measurement, for example of an ion concentration, may be performed, for example, via potentiometric measurement methods. For example, an application of the sensor part, i.e. of the sensor 100, may be a measurement of an ion concentration in liquid media, in particular in media containing water, in that said sensor may specifically serve as a comparative sensor V which, for example, reacts only slightly or minimally to common ion concentrations, common ion concentrations advantageously having an electrical conductivity of an ion solution between 5 microsiemens and 300 millisiemens.

It should be noted that the sensor 100 according to FIG. 1 is optionally supplemented with all of the features, functionalities and details described herein in reference to the other sensors. For example, the corresponding features, functionalities and details may be included in the sensor 100 individually or in combination.

Figure 2A:
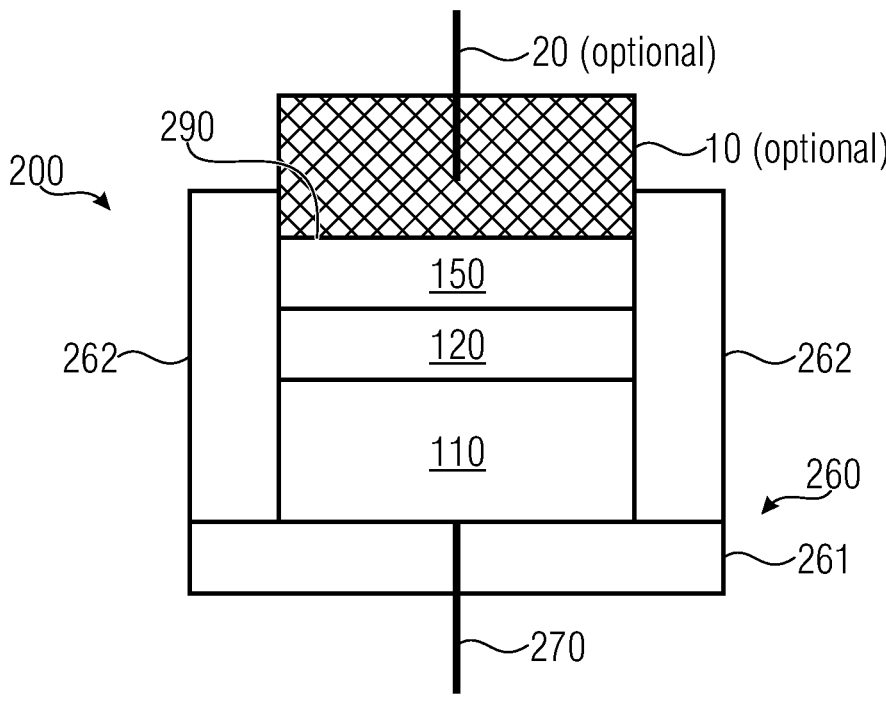
FIG. 2A a sectional side view of a sensor according to an embodiment in a measurement arrangement, configured as an EIS structure, FIG. 2B a sectional side view of a sensor according to an embodiment in a measurement arrangement, configured as an EIS structure with an intermediate layer, FIG. 3A a sectional side view of a sensor according to an embodiment in a measurement arrangement, configured as a FET structure, FIG. 3B a sectional side view of a sensor according to an embodiment in a measurement arrangement, configured as a FET structure with an intermediate layer, FIG. 4 a flowchart of a method of producing a sensor according to an embodiment, FIG. 5 a schematic representation of a sensor system according to an embodiment.

FIG. 2A shows a sectional side view of a sensor 200 according to an embodiment. The sensor 200 may, for example, correspond to the sensor 100 of FIG. 1. To better understand the function of the sensor 200, the sensor 200 is shown in a measurement arrangement that includes an optional measurement volume 10 and an optional electrode 20 in addition to the sensor 200. The sensor 200 has a first layer 110, an insulation layer 120, and a second layer 150 according to the embodiment shown in FIG. 1. The second layer 150 has a measurement surface 290 that faces away from the insulation layer. In the measurement arrangement shown, the measurement surface 290 is in contact with the measurement volume 10, which comprises, for example, a liquid containing ions.

According to an embodiment, the second layer 150 has an oxygen proportion of between 0.1% and 67%, that is, a proportion of oxygen atoms in a total number of atoms of the second layer between 0.1% and 67%. The oxygen proportion of the second layer 150 may influence a sensitivity of the second layer 150 to ions present in the measurement volume 10. Further, the oxygen proportion of the second layer 150 may influence a stability of the second layer 150 to a liquid present in the measurement volume 10. For example, the oxygen proportion of the second layer 150 may be adapted to a use of the sensor 200, such as to a liquid present in the measurement volume 10 or to a particular ion type to be measured in the measurement volume 10.

In accordance with an embodiment, the second layer 150 further comprises, i.e., in addition to the gold material, a noble-metal material having noble-metal atoms other than gold. Noble-metal atoms in the second layer 150 may increase a chemical resistance, that is, a stability, of the second layer 150 to a liquid, for example a liquid containing ions, which is in contact with the second layer 150. For example, the noble-metal atoms in the second layer 150 may partially replace gold atoms such that an oxygen proportion of the second layer 150 remains unchanged. For example, an oxygen proportion of the second layer 150 may be between 0.1% and 67%, the second layer 150 comprising a gold material and a noble-metal material having noble-metal atoms other than gold.

In accordance with an embodiment, the number of noble-metal atoms other than gold that are present in the second layer 150 is at most 25% of the number of gold atoms that are present in the second layer 150.

In accordance with an embodiment, the second layer 150 has a thickness of between 5 nm and 10 μm. For example, the thickness of the second layer 150 is a dimension of the second layer 150 in a direction perpendicular to the second layer 150. For example, the thickness of the second layer 150 may be adapted to an oxygen proportion of the second layer 150. For example, if the second layer 150 is characterized by large crystals, for example due to a high oxygen proportion in the second layer 150, a thickness of the second layer 150 of a few micrometers may be used because, although the crystals may be influenced by the medium to be measured to a depth of a few nanometers only, for example a liquid present in the measurement volume 10, grain boundaries of the crystals of the second layer 150 extend much deeper below the surface of the second layer 150. For example, the medium may move along the grain boundaries of the crystals in the second layer 150, which may allow the medium to penetrate very deeply below a surface of the second layer 150, such as a surface of the second layer 150 that is adjacent to the measurement volume 10, in the event of large crystals being present in the second layer 150. On the other hand, in the event of high crystallinity or large crystals being present in the second layer 150, a small thickness of the second layer 150 may also be selected, since the liquid to be measured can penetrate less deeply into the second layer 150 in the event of large crystals of the second layer 150. For the formation of an ion sensitivity characteristic for the substance, as little as a few nanometers of surface depth may be sufficient, i.e. for the size and characteristic of the ion sensitivity of the sensor layer (of a solid-state sensor having a structure acting via the field effect), i.e. of the second layer 150, only a few angstroms to a few nanometers of the surface may be appropriate as a minimum layer thickness. At a temperature higher than 30° C., up to several 10 nanometers of surface depth may be involved in the potential formation as the temperature increases.

In accordance with an embodiment, an oxygen concentration of the second layer 150 exhibits a gradient in a direction perpendicular to the second layer 150. For example, the oxygen concentration of the second layer 150 may be greater at a surface of the second layer 150 that faces the insulation layer 120 than at the center (with respect to a direction perpendicular to the second layer) of the second layer 150. The oxygen concentration may also increase again from the center of the second layer 150 toward the surface, i.e., toward the measurement surface 290. For example, a high oxygen concentration of the second layer 150 at a surface that faces the insulation layer 120 may increase an adhesion between the second layer 150 and the insulation layer 120. If the oxygen concentration of the second layer 150 changes along a direction perpendicular to the second layer 150, an electrical conductivity in the second layer may also change along this direction, although a quality of the sensor, for example a sensor performance, may remain unaffected by this, since the insulation layer 120, for example, may be crucial for the quality of the sensor, as said quality may be crucial for a field effect, for example between the second layer 150 and the first layer 110. For example, the second layer 150 may have a different oxygen concentration at a surface that faces the measurement volume 10, that is, at a surface that faces away from the insulation layer 120, than at a surface that faces the insulation layer 120. Thus, for example, a high oxygen concentration may be selected for the surface that faces the insulation layer 120 to increase the adhesion of the second layer 150 to the insulation layer 120, and a lower oxygen concentration may be selected for the surface of the second layer 150 that faces away from the insulation layer 120, for example to adjust a crystallinity of the second layer 150 or an ion sensitivity of the second layer 150 or a stability, i.e. a chemical or thermal resistance, of the second layer 150.

The insulation layer 120 may have an electrically and/or ionically insulating material, such as a dielectric, for example silicon dioxide, silicon nitride, or a material having a comparable or higher dielectric constant. This may increase a capacity or potential or field effect between the second layer 150 and the first layer 110, which may result in improved accuracy of the sensor 200.

In accordance with an embodiment, the insulation layer 120 has an electrical resistance greater than 10 GΩ or greater than 100 GΩ in a direction perpendicular to the insulation layer 120. A particularly high resistance of the insulation layer 120 may reduce or prevent a leakage current between the first layer 110 and the second layer 150, which may result in a better quality or accuracy of the sensor 200.

The insulation layer 120 is arranged adjacent to a main surface of the first layer 110. Further, the second layer 150 is arranged opposite the main surface of the first layer 110, adjacent to the insulation layer 120.

The sensor 200 includes an electrically conductive contact 270 having an electrically conductive connection to the first layer 110.

The electrically conductive contact 270 may be used, for example, in combination with the electrode 20 to measure a potential of the second layer 150 or of the measurement volume 10 with respect to the first layer 110. Such a measurement may be made, for example, via CV measurement ("capacitance/voltage" measurement or capacitance/voltage spectroscopy).

In accordance with an embodiment, the sensor 200 has a low ion sensitivity, for example, an ion sensitivity less than 46 mV/p(ion) at 25° C., or a sensor slope less than the Nernst slope by more than 8% at any measurement temperature, where p(ion) is, for example, a concentration of the ion to be measured in a liquid that is in contact with the measurement surface 290. As a result, a measurement value provided by the sensor 200 may be particularly well used, for example, as a reference value to determine, e.g. in combination with an ion-sensitive sensor that is sensitive to a particular ion type, a concentration of an ion type in a liquid present in the measurement volume 10.

The sensor 200 further comprises a sealing structure 260. The sealing structure 260 is arranged to spatially separate, from the first layer 110, a measurement surface 290 of the second layer 150 that faces away from the first layer 110. Therefore, the sealing structure 260 is configured to prevent ionically and/or electrically conductive contact between the measurement surface 290 and the first layer 110 by means of a liquid. The sealing structure 260 is impermeable and resistant to acidic and/or alkaline liquids. In a measurement arrangement, for example the measurement arrangement shown in FIG. 2A, the sensor 200 is in contact with a liquid, for example a liquid present in the measurement volume 10.

The sealing structure 260 may include, for example, a lateral sealing structure 262. For example, the lateral sealing structure 262 may be arranged to form the boundary of the solid-state layered structure of the sensor 200 in a direction parallel to the solid-state layered structure. For example, the lateral sealing structure 262 may be arranged to completely cover an exposed minor surface of the insulation layer 120. Further, the lateral sealing structure 262 may be configured to fully cover an exposed surface of the first layer 110 that neither faces nor faces away from the insulation layer 120. For example, a surface may be described as exposed if there is no solid-state material, such as an electrical contact, adjacent to the surface. The sealing structure 260 may further include a lateral sealing structure 261. The lateral sealing structure 261 may be arranged adjacent to a surface of the first layer 110 that faces away from the insulation layer 120, for example. For example, the lateral sealing structure 261 may be arranged adjacent to an exposed portion of a surface of the first layer 110 that faces away from the insulation layer 120, such as adjacent to a portion of this surface that is not covered by an electrical contact or other solid-state material, such as the electrical contact 270.

In order for a potential or capacitance or electric field to be formed between the first layer 110 and the second layer 150, the first layer 110 and the second layer 150 are electrically and/or ionically insulated from each other or are at least arranged such that an electrical resistance of more than 10 GΩ is present between the first layer 110 and the second layer 150. Since the sensor 200 is generally intended to be operated in a liquid, the object of the sealing structure 260 is to prevent the liquid from contacting the first layer 110 so as to prevent electrical contact between the first layer 110 and the second layer 150 by means of the liquid. Advantageously, the sealing structure 260 further prevents fluidic or mechanical or electrical contact between the liquid and the insulation layer 120.

Figure 2B:
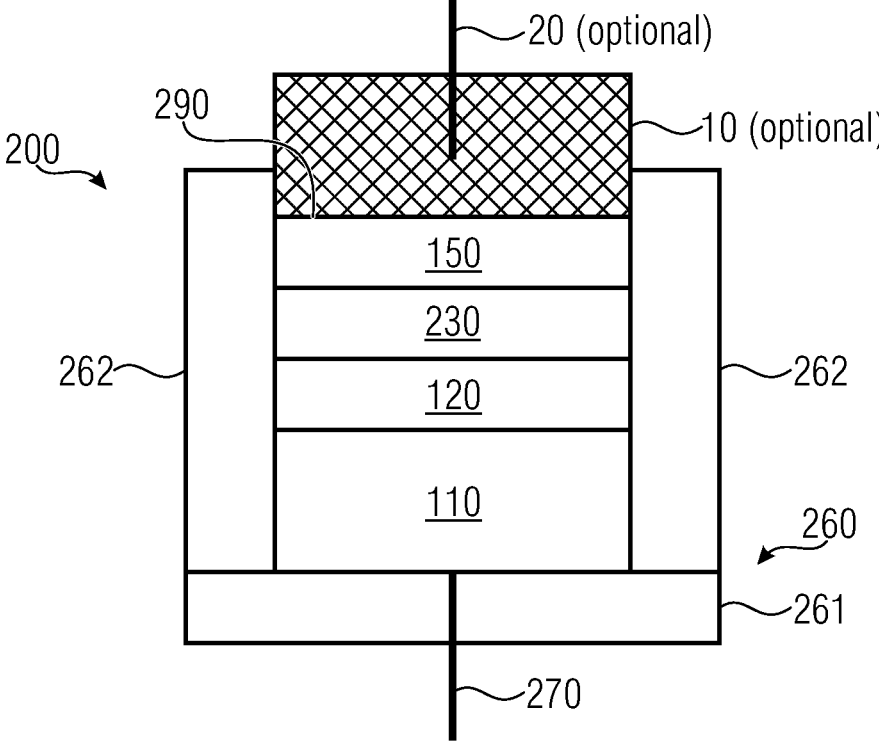

FIG. 2B shows a sectional side view of the sensor 200 in a measurement arrangement in accordance with an embodiment. The measurement arrangement includes the sensor 200. Furthermore, the measurement arrangement includes the measurement volume 10 and the electrode 20. The sensor 200 corresponds to the sensor 200 shown in FIG. 2A, and may include all features and functionalities described in connection with the sensor 200 in FIG. 2A. In accordance with the embodiment shown in FIG. 2B, the sensor 200 additionally comprises an electrically and/or ionically conductive intermediate layer 230 arranged between the insulation layer 120 and the second layer 150.

The insulation layer 120 is arranged adjacent to a main surface of the first layer 110. Further, the intermediate layer 230 is arranged opposite the main surface of the first layer 110 adjacent to the insulation layer 120. Unlike the embodiment shown in FIG. 2A, in the embodiment shown in FIG. 2B, the second layer 150 is arranged opposite the insulation layer 120, adjacent to the intermediate layer 230.

In accordance with an embodiment, the intermediate layer 230 has a thickness of between 5 nm and 10 μm.

In accordance with an embodiment, the intermediate layer 230 has an electrical resistance less than 100 MΩ in a direction perpendicular to the intermediate layer 230.

For example, the intermediate layer 230 is configured such that charge carriers, for example electrons, are as mobile as possible in the intermediate layer 230. This may be ensured, for example, by a low electrical resistance. A high mobility of charge carriers in the intermediate layer 230 may ensure that a polarization occurring in the second layer 150, for example caused by ions at the measurement surface 290, generates a similar polarization in the intermediate layer 230, so that a capacitance of the sensor 200 between the first layer 110 and the second layer 150 or the intermediate layer 230 is not or only slightly increased due to the intermediate layer 230.

For example, the function of the intermediate layer 230 is to provide an adhesion between the second layer 150 and the insulation layer 120. For example, adhesion of a gold material to the insulation layer 120 may be very low. Because of the intermediate layer 230, for example, an adhesion of the second layer 150 to the solid-state layered structure may be improved or established.

Figure 3A:
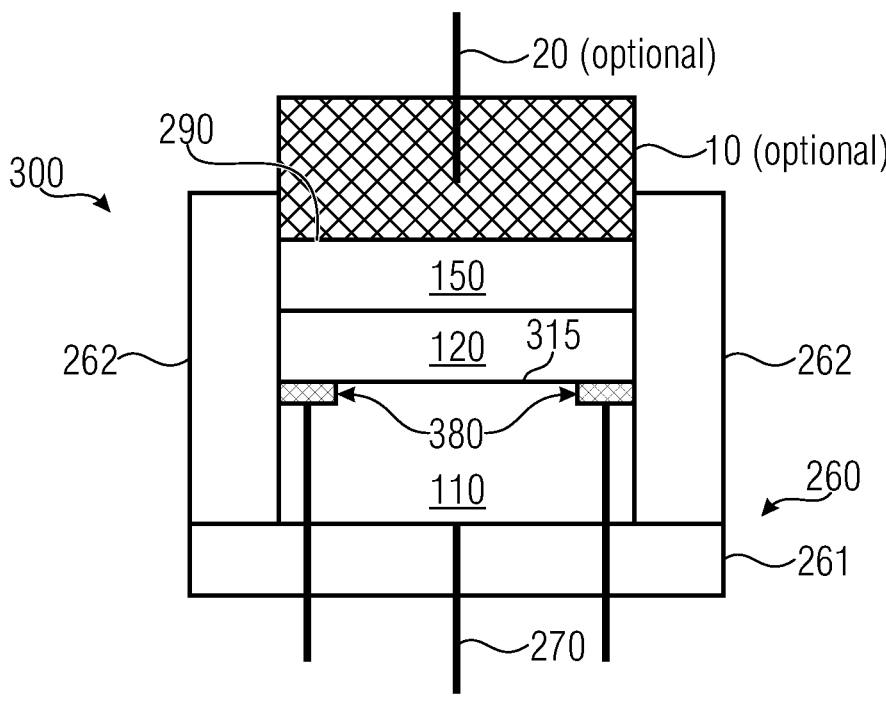

FIG. 3A shows a sectional view of a sensor 300 in accordance with an embodiment in a measurement arrangement. In addition to the sensor 300, the measurement arrangement includes a measurement volume 10 and an electrode 20. The sensor 300 may correspond, for example, to the sensor 100, 200. The sensor 300 includes a first layer 110, a second layer 150, an insulation layer 120, a sealing structure 260, and an electrical contact 270 corresponding to the sensor 200 described in FIG. 2A. In addition, the sensor 300 includes a plurality of measurement contacts 380 that have an electrically conductive connection to the first layer 110. The measurement contacts 380 are arranged adjacent to a main surface 315 of the first layer 110 that faces the second layer 150.

The plurality of measurement contacts 380 may, for example, enable measurement in accordance with the field-effect transistor (FET) principle. For example, a change in an ion concentration in the measurement volume 10 adjacent to the measurement surface 290 of the second layer 150 may cause a change in a potential between the first layer 110 and the second layer 150. This change in potential may in turn, by means of a field effect, cause a concentration of charge carriers in a region adjacent to the main surface 315 of the first layer in the first layer 110. Such a change in the charge carrier density may be detected by means of the plurality of measurement contacts 380. For example, the plurality of measurement contacts 380 may be used to determine an electrical resistance or an electrical conductivity, which may include a measurement of an electrical voltage or an electrical current. For example, determination of the electrical resistance or electrical conductivity in the first layer 110 may be performed by means of two, three, or four measurement contacts 380.

In a measurement based on the FET principle, the electrical contact 270 may be used to select a suitable operating point, for example a potential at which the sensor has a suitable slope, for example a particularly high slope. For this purpose, a voltage may be applied between the electrical contact 270 and the electrode 20, for example.

The plurality of measurement contacts 380 may, for example, be configured as highly doped regions in the first layer 110. Highly doped may mean that they have a higher doping than does the semiconductor material of the first layer 110. The plurality of measurement contacts 380 may further comprise a metallic conductor.

Figure 3B:
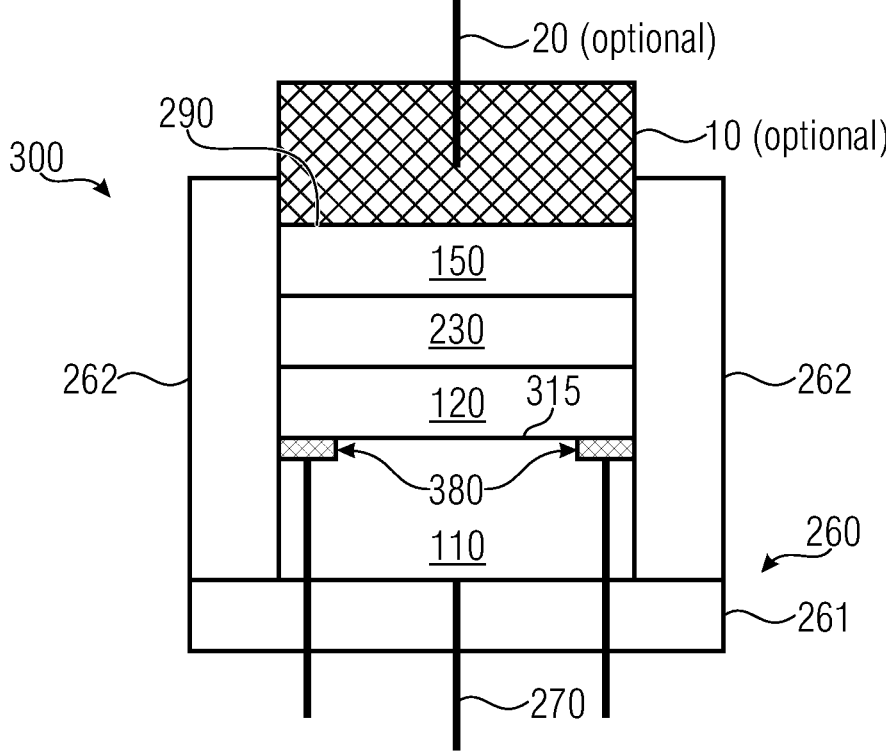

FIG. 3B shows a sectional view of the sensor 300 in accordance with an embodiment in a measurement arrangement. In addition to the sensor 300, the measurement arrangement includes the optional measurement volume 10 and the optional electrode 20. The embodiment of the sensor 300 shown in FIG. 3B combines the properties of the embodiment of the sensor 300 shown in FIG. 3A, in particular the plurality of measurement contacts 380, with the properties of the sensor 200 shown in FIG. 2B, in particular of the intermediate layer 230. The sensor 300 may have all features, functions and advantages of the sensor 200 individually or in combination with one other.

Figure 4:
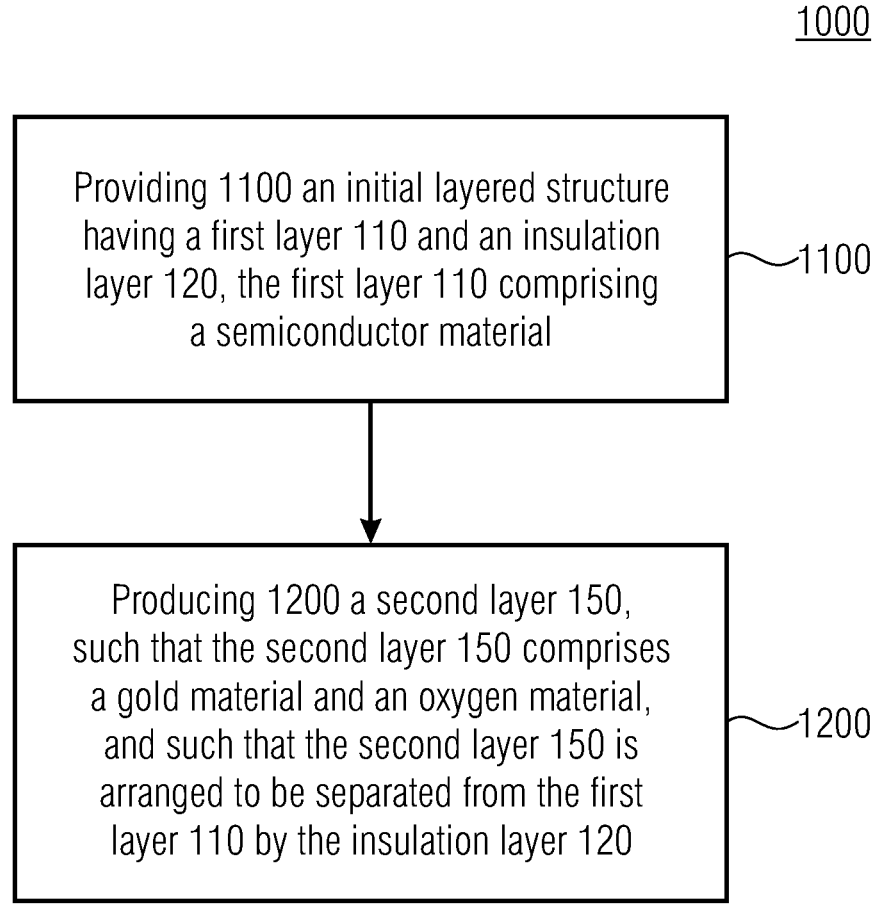

FIG. 4 shows a flowchart of a method of 1000 of producing a sensor 100, 200, 300 in accordance with an embodiment. The step 1100 of the method 1000 includes providing an initial layered structure having a first layer 110 and an insulation layer 120, wherein the first layer 110 comprises a semiconductor material. The step 1200 of the method 1000 includes producing a second layer 150 such that the second layer 150 comprises a gold material and an oxygen material, and such that the second layer 150 is arranged separately from the first layer 110 by the insulation layer 120.

For example, an insulator, e.g. the insulation layer 120, is formed on the first layer 110, for example on a semiconductor substrate, e.g. silicon. On the insulation layer 120, for example the insulator, a second layer 150, e.g. a sensor layer, is produced, e.g. comprising gold having an oxygen concentration of between 0.1% and 67%. Optionally, an electrically conductive layer, for example the intermediate layer 230, may be produced prior to the production of the gold-oxygen layer, for example the production 1200 of the second layer 150. For use in aqueous media, it is advantageous to protect the rear side of the semiconductor substrate, that is, a main surface of the first layer 110 that faces away from the second layer 150, and a side of the semiconductor substrate, that is, a minor surface of the first layer 110, from the aqueous media, e.g. the measurement volume 10, by means of a stable insulation, e.g. the sealing structure 260. The contacting, for example the electrical contacting, which may be used for measuring a potential or a capacitance or a field effect between the first layer 110 and the second layer 150, for example the contacting for the EIS CV measurement at the EIS (electrolyte-insulator-semiconductor) structure, is effected via an electrically conductive contact 270, for example a metal contact, at the first layer 110, e.g. at the semiconductor substrate, and via a low-resistance contact 20 directly into a conductive measurement medium, for example a measurement medium located within the measurement volume 10. The contacting for a field-effect transistor structure, for example for the sensor 300, is effected via the plurality of measurement contacts 380, for example a plurality of metal contacts, and via the electrically conductive contact 270, for example a metal semiconductor substrate contact, and via a low-resistance contact, for example the electrode 20, directly into the conductive measurement medium located in the measurement volume 10, for example.

For example, for the purpose of adjusting a certain characteristic behavior of the sensor layer towards specific complex ions, foreign atoms, that is, atoms other than gold atoms and oxygen atoms, may be added to the second layer 150, but advantageously, the concentration of gold atoms in the second layer 150 is greater than the concentration of the added foreign atoms in the second layer 150.

For example, the production of the second layer 150 may be performed such that the second layer has a specific oxygen proportion such that an ion sensitivity of the sensor 100, 200, 300 has a value co-determined by the oxygen proportion. For example, a large proportion of the oxygen material in the second layer has a particularly beneficial effect on the insensitivity of the second layer to ions. Further, the method 1000 may optionally include forming the second layer 150, which forming may be performed, for example, in an aqueous solution, and which forming is performed, for example, such that the oxygen proportion of the second layer is increased such that the oxygen proportion has a value adapted to an application of the sensor 100, 200, 300, for example.

In other words, producing 1200 the second layer 150 may optionally include adjusting an ion sensitivity of the sensor 100, 200, 300.

Figure 5:
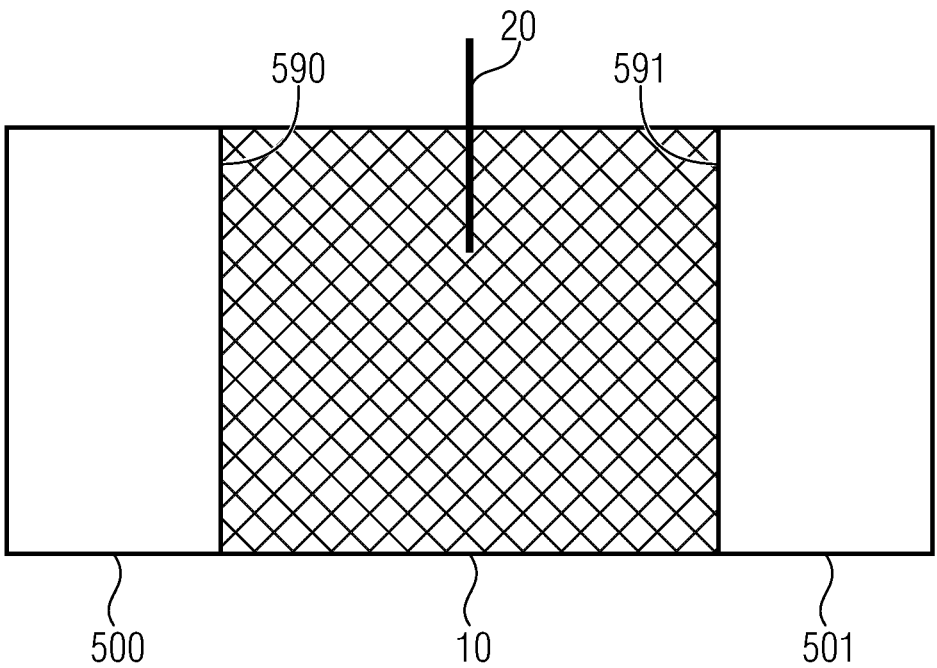

FIG. 5 shows a schematic diagram of a sensor system 5000 according to an embodiment. The sensor system 5000 has a sensor 500, which may be, for example, the sensor 100, 200, 300. The sensor 500 comprises a measurement surface 590. The measurement surface 590 is, for example, the measurement surface 290. The sensor system 5000 further comprises an ion-sensitive sensor 501 having an ion-sensitive sensor region 591. Further, the sensor system 5000 comprises a measurement volume 10 adjacent to the measurement surface 590 of the sensor 500 and to the ion-sensitive sensor region 591 of the ion-sensitive sensor 501. Further, the sensor system 5000 comprises a grounding contact 20, said grounding contact 20 being arranged adjacent to or at least partially within the measurement volume 10. The arrangement shown in FIG. 5, i.e. the position and orientation, of the sensor 500 and of the sensor 501, or of the measurement surface 590 and of the ion-sensitive sensor region 591, is to be understood as exemplary.

The measurement volume 10 may, for example, be configured to hold a liquid whose ion concentration is to be determined, for example a concentration of a particular ion type. The ion-sensitive sensor region 591 is typically sensitive to the ion type to be determined. In order to determine an ion concentration from a measurement value of the ion-sensitive sensor 501, a comparison value or a reference value may typically be used, for example measured by a less ion-sensitive sensor, typically at the same time and in the same liquid. The sensor 500 may be particularly well suited to provide such a reference value or comparison value because it has a particularly low sensitivity, advantageously a minimal sensitivity, to the ion type to be measured. Under measurement conditions, the grounding contact 20 has an electrical contact to a liquid to be measured. Thus, the grounding contact 20 may avoid electrical charging. The grounding contact 20 may, for example, be a metal contact or comprise a metal. For example, the measurement surface 590 is a surface of the second layer of the sensor 500. Typically, the second layer of the sensor 500 has a lower sensitivity to an ion to be detected than does a material of the ion-sensitive sensor region of the ion-sensitive sensor.

For example, the solid-state sensor structure 500 is the less ion-sensitive sensor part with regard to the more ion-sensitive sensor part 501 and to the grounding contact 20 in liquid media, and a measurement is made while using potentiometric measurement methods.

If the ion sensitivity of a sensor, e.g. of the sensor 500, is less than 40 mV/p(ion$_x$) as compared to a sensor having more than 55 mV/p(ion$_x$), e.g. the sensor 501, a change in the ion concentration of the ion$_x$ upon a change in a measurement medium, for example within in the measurement volume 10, may be determined from a sensor signal difference: (p(ion$_x$)=−lg a$_{ionx}$=−lg (c$_{ionx}$·f$_{ionx}$), a is the activity, c is the concentration, f is the activity coefficient, x is any ion type). As such a comparative sensor, sensitivity to the ion x should be minimal.

The invention may further be realized by the following embodiments:

One embodiment includes a sensor system comprising the following elements: a sensor 100;200;300;500, wherein the second layer 150 of the sensor 100;200;300;500 has a measurement surface 290 that faces away from the first layer 110 of the sensor; an ion-sensitive sensor 501 having an ion-sensitive sensor region 591; a measurement volume 10 adjacent to the measurement surface 590 of the sensor 500 and to the ion-sensitive sensor region 591 of the ion-sensitive sensor 501; a grounding contact (20), wherein the grounding contact 20 is arranged adjacent to or at least partially within the measurement volume 10.

Another embodiment includes the sensor system described, wherein the ion-sensitive sensor 501 comprises a solid-state structure and/or wherein the grounding contact 20 comprises a metal.

Alternatively or additionally, the second layer 150 of the sensor 100;200;300;500 has a lower sensitivity to an ion to be detected than does a material of the ion-sensitive sensor region 591 of the ion-sensitive sensor 501.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] M. Fujihira et. al., J. Electroanal. Chem. 106, 413, (1980)
[2] H.-S. Wong and M. White, IEEE Trans. Electron Devices 36, 479, (1989)
[3] D. Wilhelm et. al., Sensors and Actuators B4, 145, (1991)
[4] V. Rocher et. al., J. Electrochem. Soc. 141, 535, (1994)
[5] T. Matsuo and H. Nakajima, Sensors and Actuators 5, 293, (1984)
[6] Van Den Berg et. al. Sensors and Actuators 8, 129, (1985)
[7] P. Bergveld et. al., Sensors and Actuators 18, 309, (1989)
[8] M. Chudy et. al. Sensors and Actuator B57, 47, (1999)
[9] H.-S. Wong, Dissertation, Lehigh University 1988
[10] M. Zabarowski et. al., Przeglad Elektrotechniczny 2014, R, 90, 11, 142
[11] R. Brdička, Grundlagen der physikalischen Chemie, 10$^{th}$ edition, VEB deutscher Verlag der Wissenschaften, Berlin 1971

The invention claimed is:

1. A sensor comprising a solid-state layered structure, the sensor comprising:
   a first layer comprising a semiconductor material;
   a second layer comprising a gold material and an oxygen material; and
   an insulation layer arranged between the first layer and the second layer, wherein the second layer is arranged to be separated from the first layer by the insulation layer,
   wherein the second layer comprises a measurement surface that faces away from the insulation layer,
   wherein the second layer exhibits a thickness of between 5 nm and 10 μm, and
   wherein the second layer exhibits an oxygen proportion of between 0.1 at % and 67 at %.

2. The sensor as claimed in claim 1, wherein a shared total proportion of oxygen atoms and of noble-metal atoms comprising the gold material in the second layer amounts to at least 99 at %.

3. The sensor as claimed in claim 1, wherein the second layer further comprises a noble-metal material comprising noble-metal atoms other than gold.

4. The sensor as claimed in claim 3, wherein a number of noble-metal atoms other than gold in the second layer is at most 25% of a number of gold atoms in the second layer.

5. The sensor as claimed in claim 1, wherein an oxygen concentration of the second layer exhibits a gradient in a direction perpendicular to the second layer.

6. The sensor as claimed in claim 1, further comprising a plurality of measurement contacts comprising electrically conductive connections to the first layer, wherein the plurality of measurement contacts is arranged adjacent to a main surface of the first layer that faces the second layer.

7. The sensor as claimed in claim 1, wherein the insulation layer exhibits an electrical resistance greater than 10 GOhm in a direction perpendicular to the insulation layer.

8. The sensor as claimed in claim 1, wherein the solid-state layered structure further comprises an electrically and/or ionically conductive intermediate layer arranged between the insulation layer and the second layer.

9. The sensor as claimed in claim 8, wherein the intermediate layer exhibits a thickness between 5 nm and 10 μm.

10. The sensor as claimed in claim 8, wherein the intermediate layer exhibits an electrical resistance less than 100 MOhm in a direction perpendicular to the intermediate layer.

11. The sensor as claimed in claim 8, wherein the insulation layer is arranged adjacent to a main surface of the first layer, and wherein the intermediate layer is arranged opposite the main surface of the first layer, adjacent to the insulation layer, and wherein the second layer is arranged opposite the insulation layer, adjacent to the intermediate layer.

12. The sensor as claimed in claim 1, wherein the insulation layer is arranged adjacent to a main surface of the first layer, and wherein the second layer is arranged opposite the main surface of the first layer, adjacent to the insulation layer.

13. The sensor as claimed in claim 1, wherein the sensor further comprises a sealing structure, wherein the sealing structure is arranged to spatially separate, from the first layer, the measurement surface of the second layer that faces away from the first layer, wherein the sealing structure is configured to prevent ionically and/or electrically conductive contact between the measurement surface and the first layer by means of a liquid, and wherein the sealing structure is impermeable and resistant to acidic and/or alkaline liquids.

14. The sensor as claimed in claim 1, wherein the sensor further comprises an electrically conductive contact electrically connected to the first layer.

15. The sensor as claimed in claim 1, wherein the sensor exhibits an ion sensitivity lower than 46 mV/p(ion) at 25° C., or a sensor slope less than Nernst slope by more than 8% at any measurement temperature.

16. The sensor as claimed in claim 1, wherein the insulation layer is configured to electrically insulate the first layer from the second layer.

17. The sensor as claimed in claim 1, wherein the sensor is a sensor for determining a reference value for ion concentration measurement.

18. The sensor as claimed in claim 1, wherein the measurement surface is configured for making contact with a measurement volume.

19. A sensor system comprising:

a sensor comprising a solid-state layered structure, the sensor comprising:

a first layer comprising a semiconductor material;

a second layer comprising a gold material and an oxygen material;

an insulation layer arranged between the first layer and the second layer, wherein the second layer is arranged to be separated from the first layer by the insulation layer, wherein the second layer comprises a measurement surface that faces away from the insulation layer, wherein the second layer exhibits a thickness of between 5 nm and 10 μm, and wherein the second layer exhibits an oxygen proportion of between 0.1 at % and 67 at %;

an ion-sensitive sensor comprising an ion-sensitive sensor region;

a measurement volume adjacent to the measurement surface of the sensor and the ion-sensitive sensor region of the ion-sensitive sensor; and a grounding contact, the grounding contact being arranged adjacent to or within the measurement volume.

20. A method of producing a sensor, comprising:

providing an initial layered structure comprising a first layer and an insulation layer, the first layer comprising a semiconductor material; and producing a second layer, such that the second layer comprises a gold material and an oxygen material, such that the second layer exhibits an oxygen proportion of between 0.1 at % and 67 at %, such that the second layer exhibits a thickness of between 5 nm and 10 μm, such that the second layer comprises a measurement surface that faces away from the insulation layer, and such that the second layer is arranged to be separated from the first layer by the insulation layer.

21. The method as claimed in claim 20, further comprising:

producing an intermediate layer on the initial layered structure, wherein the intermediate layer comprises an electrically and/or ionically conductive material;

such that the intermediate layer is arranged to be separated from the first layer by the insulation layer; and wherein producing the intermediate layer is performed prior to producing the second layer.

22. The method as claimed in claim 20, wherein producing the second layer comprises adjusting an ion sensitivity of the sensor.

* * * * *